United States Patent
Matula et al.

(10) Patent No.: US 10,873,538 B2
(45) Date of Patent: Dec. 22, 2020

(54) AUTOMATIC CLOUD CAPACITY ADJUSTMENT

(71) Applicant: Avaya Inc., Santa Clara, CA (US)

(72) Inventors: Valentine C. Matula, Granville, OH (US); David Skiba, Golden, CO (US); George Erhart, Loveland, CO (US)

(73) Assignee: Avaya Inc., Santa Clara, CA (US)

( * ) Notice: Subject to any disclaimer, the term of this patent is extended or adjusted under 35 U.S.C. 154(b) by 203 days.

(21) Appl. No.: 14/704,071

(22) Filed: May 5, 2015

(65) Prior Publication Data
US 2016/0330131 A1   Nov. 10, 2016

(51) Int. Cl.
| | |
|---|---|
| *H04L 12/923* | (2013.01) |
| *H04L 12/24* | (2006.01) |
| *H04L 29/08* | (2006.01) |
| *H04L 12/26* | (2006.01) |
| *H04W 4/18* | (2009.01) |

(52) U.S. Cl.
CPC ........ *H04L 47/762* (2013.01); *H04L 41/0896* (2013.01); *H04L 67/1004* (2013.01); *H04L 67/322* (2013.01); *H04L 41/5096* (2013.01); *H04L 43/0817* (2013.01); *H04L 43/0876* (2013.01); *H04M 2203/40* (2013.01); *H04W 4/18* (2013.01)

(58) Field of Classification Search
CPC .......................... H04L 47/762; H04L 47/862
USPC ....................................................... 709/224
See application file for complete search history.

(56) References Cited

U.S. PATENT DOCUMENTS

| | | | | |
|---|---|---|---|---|
| 5,506,847 A | * | 4/1996 | Shobatake | .......... H04L 12/2801 370/338 |
| 5,673,253 A | * | 9/1997 | Shaffer | .................... H04L 47/10 370/229 |
| 5,734,589 A | * | 3/1998 | Kostreski | .................. G06F 8/65 348/E5.006 |
| 5,805,578 A | * | 9/1998 | Stirpe | ..................... H04L 45/02 370/255 |
| 5,896,561 A | * | 4/1999 | Schrader | ............... H04L 1/0025 370/445 |

(Continued)

OTHER PUBLICATIONS

Merriam-Webster, "economic", 2016.*

(Continued)

*Primary Examiner* — Ondrej C Vostal
(74) *Attorney, Agent, or Firm* — Sheridan Ross P.C.

(57) ABSTRACT

Allocation of resources utilized by a contact center remains a balancing act between the burden of having resources that are generally underutilized and underperforming due to resource constraints. Many contact centers support a variety of communication types (e.g., audio-video, audio, text, email, etc.) associated with a respective communication channel. Communications may be dynamically incentivized or allocated from one communication channel having greater resource demands to another communication channel having lesser resource demands. Additionally, the resources of the contact center may be shared by customers of clients utilizing the contact center. As a result, one customer having a spike in demand may have their, and/or another customer's, communications reallocated to the less demanding channel to manage contact center resource utilization.

18 Claims, 7 Drawing Sheets

(56) References Cited

U.S. PATENT DOCUMENTS

| | | | | |
|---|---|---|---|---|
| 5,915,214 A * | 6/1999 | Reece | H04M 15/49 | 379/114.01 |
| 6,175,564 B1 * | 1/2001 | Miloslavsky | G06Q 10/107 | 348/E7.082 |
| 6,278,890 B1 * | 8/2001 | Chassaing | A61B 7/00 | 600/407 |
| 6,282,683 B1 * | 8/2001 | Dapper | G06F 17/14 | 348/E7.07 |
| 6,314,293 B1 * | 11/2001 | Servi | H04W 28/16 | 379/133 |
| 6,519,461 B1 * | 2/2003 | Andersson | H04W 28/18 | 455/450 |
| 6,580,721 B1 * | 6/2003 | Beshai | H04L 47/10 | 370/395.2 |
| 6,650,624 B1 * | 11/2003 | Quigley | H04L 1/203 | 370/252 |
| 6,856,680 B2 * | 2/2005 | Mengshoel | H04M 3/5233 | 379/265.05 |
| 6,868,390 B1 * | 3/2005 | Shimada | G06Q 30/02 | 705/14.41 |
| 7,061,929 B1 * | 6/2006 | Eberle | H04L 12/5692 | 370/423 |
| 7,103,562 B2 * | 9/2006 | Kosiba | G06Q 10/04 | 705/7.38 |
| 7,397,846 B1 * | 7/2008 | Beser | H04L 12/2801 | 375/222 |
| 7,907,527 B2 * | 3/2011 | Meleis | H04L 43/16 | 370/233 |
| 7,921,207 B2 * | 4/2011 | DeCenzo | H04N 7/165 | 709/203 |
| 8,015,302 B2 * | 9/2011 | Branam | H04N 5/44543 | 709/219 |
| 8,224,885 B1 * | 7/2012 | Doucette | G06F 9/5044 | 709/201 |
| 8,259,687 B2 * | 9/2012 | Foore | H04J 3/1682 | 370/335 |
| 8,265,261 B1 * | 9/2012 | Adamson | H04M 3/5166 | 379/265.02 |
| 8,275,349 B2 * | 9/2012 | Smith | H04W 72/10 | 455/404.1 |
| 8,305,894 B1 * | 11/2012 | Zang | H04L 47/521 | 370/232 |
| 8,311,863 B1 * | 11/2012 | Kemp | G06Q 10/0639 | 705/7.11 |
| 8,479,269 B1 * | 7/2013 | Malreddy | H04L 63/101 | 713/161 |
| 8,521,153 B1 * | 8/2013 | Billau | H04W 28/0289 | 455/424 |
| 8,634,543 B2 | 1/2014 | Flockhart et al. | | |
| 8,719,627 B2 | 5/2014 | Watson et al. | | |
| 8,788,647 B1 * | 7/2014 | Nolle | H04L 12/2801 | 370/230 |
| 8,811,597 B1 * | 8/2014 | Hackbarth | G06Q 10/06393 | 379/266.08 |
| 8,880,616 B2 * | 11/2014 | Schuelke | H04L 67/104 | 709/203 |
| 8,923,768 B2 * | 12/2014 | Ma | A61B 5/7475 | 455/41.2 |
| 8,938,063 B1 * | 1/2015 | Hackbarth | G06Q 10/00 | 379/265.03 |
| 9,020,920 B1 * | 4/2015 | Haggerty | G06Q 10/06315 | 707/705 |
| 9,035,992 B1 * | 5/2015 | Leske | H04N 7/147 | 348/14.04 |
| 9,280,782 B1 * | 3/2016 | George | H04N 7/15 | |
| 9,300,489 B1 * | 3/2016 | Nolle | H04L 47/762 | |
| 9,337,918 B2 * | 5/2016 | Bell | H04B 7/18515 | |
| 9,351,193 B2 * | 5/2016 | Raleigh | H04M 15/80 | |
| 9,668,184 B1 * | 5/2017 | Ramamurthy | H04W 36/16 | |
| 2002/0044527 A1 * | 4/2002 | Jiang | H04W 72/1231 | 370/229 |
| 2002/0056107 A1 * | 5/2002 | Schlack | H04N 7/17318 | 725/46 |
| 2002/0056132 A1 * | 5/2002 | Wilson | H04L 1/0001 | 725/118 |
| 2002/0073150 A1 * | 6/2002 | Wilcock | H04L 67/38 | 709/204 |
| 2002/0073208 A1 * | 6/2002 | Wilcock | H04L 12/185 | 709/227 |
| 2002/0188789 A1 * | 12/2002 | Kim | H04L 12/66 | 710/305 |
| 2002/0199120 A1 * | 12/2002 | Schmidt | H04L 51/12 | 726/8 |
| 2003/0012217 A1 * | 1/2003 | Andersson | H04W 36/06 | 370/437 |
| 2003/0023681 A1 * | 1/2003 | Brown | H04L 12/1822 | 709/204 |
| 2003/0142623 A1 * | 7/2003 | Bernhard | H04L 12/5695 | 370/229 |
| 2003/0229900 A1 * | 12/2003 | Reisman | G06F 17/30873 | 725/87 |
| 2004/0008726 A1 * | 1/2004 | Kelly | H04L 12/2854 | 370/468 |
| 2004/0090934 A1 * | 5/2004 | Cha | H04L 47/14 | 370/329 |
| 2004/0109426 A1 * | 6/2004 | Veerepalli | H04B 7/2628 | 370/335 |
| 2004/0170160 A1 * | 9/2004 | Li | H04M 3/465 | 370/352 |
| 2005/0107091 A1 * | 5/2005 | Vannithamby | H04W 28/08 | 455/453 |
| 2005/0289618 A1 * | 12/2005 | Hardin | H04L 47/15 | 725/95 |
| 2006/0291400 A1 * | 12/2006 | Balasaygun | H04L 29/06 | 370/242 |
| 2007/0055777 A1 * | 3/2007 | Lawrence | H04M 3/5232 | 709/226 |
| 2007/0060158 A1 * | 3/2007 | Medepalli | H04W 72/085 | 455/450 |
| 2007/0092012 A1 * | 4/2007 | Wilhelmsson | H04L 25/023 | 375/260 |
| 2007/0143186 A1 * | 6/2007 | Apple | G06Q 30/02 | 705/14.48 |
| 2008/0159210 A1 * | 7/2008 | Zaks | H04W 72/06 | 370/329 |
| 2008/0201311 A1 * | 8/2008 | Ertugrul | G06F 17/30867 | |
| 2008/0225787 A1 * | 9/2008 | Parts | H04L 5/0094 | 370/329 |
| 2008/0290987 A1 * | 11/2008 | Li | G06Q 30/02 | 340/5.1 |
| 2008/0299954 A1 * | 12/2008 | Wright | H04W 4/029 | 455/414.1 |
| 2009/0025027 A1 * | 1/2009 | Craner | H04H 20/103 | 725/32 |
| 2009/0070650 A1 * | 3/2009 | Bourlas | H04L 1/1887 | 714/748 |
| 2009/0092151 A1 * | 4/2009 | Raguet | H04L 12/5601 | 370/468 |
| 2009/0172723 A1 * | 7/2009 | Shkedi | H04N 5/76 | 725/32 |
| 2009/0262709 A1 * | 10/2009 | Mason | H04L 1/20 | 370/336 |
| 2010/0057548 A1 * | 3/2010 | Edwards | G06Q 30/0211 | 705/14.13 |
| 2010/0067379 A1 * | 3/2010 | Zhao | H04L 41/147 | 370/235 |
| 2010/0134590 A1 * | 6/2010 | Lindstrom | H04L 65/1016 | 348/14.11 |
| 2010/0138561 A1 * | 6/2010 | Church | H04W 52/367 | 709/248 |
| 2010/0151837 A1 * | 6/2010 | Mang | H04L 12/5695 | 455/414.1 |
| 2010/0235218 A1 | 9/2010 | Erhart et al. | | |
| 2010/0296417 A1 | 11/2010 | Steiner | | |
| 2010/0296646 A1 * | 11/2010 | Hemm | G06Q 10/107 | 379/265.02 |

(56) References Cited

U.S. PATENT DOCUMENTS

| | | | |
|---|---|---|---|
| 2010/0315968 A1* | 12/2010 | Zhou | H04L 1/0009 370/252 |
| 2011/0010316 A1* | 1/2011 | Hamilton, II | G06N 3/006 706/12 |
| 2011/0038264 A1* | 2/2011 | Ishii | H04L 47/10 370/238 |
| 2011/0125793 A1 | 5/2011 | Erhart et al. | |
| 2011/0125826 A1 | 5/2011 | Erhart et al. | |
| 2011/0182283 A1* | 7/2011 | Van Buren | H04M 7/0075 370/352 |
| 2011/0219056 A1* | 9/2011 | Carmel | H04L 69/14 709/202 |
| 2011/0269502 A1* | 11/2011 | Clark | H04B 1/006 455/552.1 |
| 2011/0314145 A1* | 12/2011 | Raleigh | H04L 41/0893 709/224 |
| 2012/0079021 A1* | 3/2012 | Roman | H04L 12/6418 709/204 |
| 2012/0106340 A1* | 5/2012 | Hoymann | H04B 7/2606 370/235 |
| 2012/0180101 A1* | 7/2012 | Davis | H04N 21/23608 725/116 |
| 2012/0195216 A1* | 8/2012 | Wu | H04W 72/0486 370/252 |
| 2012/0218929 A1* | 8/2012 | Son | H04L 1/0027 370/311 |
| 2012/0238272 A1* | 9/2012 | Hwang | H04W 36/245 455/436 |
| 2012/0294169 A1* | 11/2012 | Chui | H04W 52/0274 370/252 |
| 2012/0311173 A1* | 12/2012 | Agarwal | H04L 43/0829 709/231 |
| 2012/0322440 A1* | 12/2012 | Jeong | H04W 4/70 455/425 |
| 2013/0070619 A1* | 3/2013 | Anthony, Jr. | H04W 24/02 370/252 |
| 2013/0072146 A1* | 3/2013 | Smith | H04L 47/24 455/404.1 |
| 2013/0078946 A1* | 3/2013 | Pecen | H04L 63/0823 455/411 |
| 2013/0121161 A1* | 5/2013 | Szabo | H04L 43/0876 370/241 |
| 2013/0124641 A1* | 5/2013 | Ryabchun | G06F 11/3495 709/206 |
| 2013/0176856 A1* | 7/2013 | Wang | H04L 5/0064 370/241 |
| 2013/0263172 A1* | 10/2013 | McCoy | H04N 21/25891 725/27 |
| 2013/0279334 A1* | 10/2013 | Xu | H04W 24/04 370/235 |
| 2013/0294272 A1* | 11/2013 | Xiao | H04W 52/0232 370/252 |
| 2014/0019225 A1* | 1/2014 | Guminy | G06Q 30/02 705/14.39 |
| 2014/0066085 A1* | 3/2014 | Sun | H04W 72/082 455/454 |
| 2014/0068059 A1* | 3/2014 | Cole | H04L 43/10 709/224 |
| 2014/0114766 A1* | 4/2014 | Jang | G06Q 30/0267 705/14.64 |
| 2014/0140494 A1* | 5/2014 | Zhakov | H04M 3/5175 379/265.03 |
| 2014/0188597 A1* | 7/2014 | Nangle | G06Q 30/0246 705/14.45 |
| 2014/0244429 A1* | 8/2014 | Clayton | G06Q 30/0631 705/26.7 |
| 2014/0254362 A1* | 9/2014 | Ganu | H04W 48/12 370/230 |
| 2014/0357234 A1* | 12/2014 | Sullivan | H04W 4/06 455/412.1 |
| 2015/0103680 A1* | 4/2015 | Anand | H04W 72/1231 370/252 |
| 2015/0180787 A1* | 6/2015 | Hazelet | H04L 47/30 370/235 |
| 2015/0206197 A1* | 7/2015 | Toval | G06Q 30/0275 705/14.71 |
| 2015/0282074 A1* | 10/2015 | Szabo | H04L 47/127 370/311 |
| 2015/0310481 A1* | 10/2015 | Brown | G06Q 30/0243 705/14.42 |
| 2015/0341632 A1* | 11/2015 | Syed | H04N 19/0006 375/240.03 |
| 2015/0351114 A1* | 12/2015 | Wolf | H04L 67/1085 370/330 |
| 2016/0012465 A1* | 1/2016 | Sharp | G06Q 20/18 705/14.17 |
| 2016/0134317 A1* | 5/2016 | Hu | H04W 68/02 455/558 |
| 2016/0183276 A1* | 6/2016 | Marinier | H04W 72/02 370/329 |
| 2016/0234078 A1* | 8/2016 | Jana | H04L 67/02 |

OTHER PUBLICATIONS

Merriam-Webster, "threshold", 2016.*
Merriam-Webster, "predict", 2017.*
Merriam-Webster, "threshold", 2017.*
RDocumentation, "setThreshold", 2017.*
Kim, "Internet-centric solution is more than moving online", Lexology, 2015.*
Microsoft Computer Dictionary, "real-time", 2002, p. 441.*
Montenegro et al., "Lone Thin Networks", RFC2757, 2000.*
Cook, Twilio, "Call Center vs. Contact Center: What's the Difference", 2019 (Year: 2019).*
Merriam-Webster, "incentive", 2019 (Year: 2019).*
TechTarget, "contact center", 2019 (Year: 2019).*
TechTarget, "Contact Center: Glossary", 2019 (Year: 2019).*
Handley et al., "SDP: Session Description Protocol", RFC 2327, 1998 (Year: 1998).*
Merriam-Webster, "threshold", 2020 (Year: 2020).*
Buyya et al., "InterCloud: Utility-Oriented Federation of Cloud Computing Environments for Scaling of Application Services," Cloud Computing and Distributed Systems (CLOUDS) Laboratory, 2010, 20 pages.
Spencer, "Best Practices in Evaluating Elastic Load Balancing," amazon web services, retrieved from https://aws.amazon.com/articles/1636185810492479, 2012, 6 pages.

* cited by examiner

AUTOMATIC CLOUD CAPACITY ADJUSTMENT

FIELD OF THE DISCLOSURE

The present disclosure is generally directed toward multi-tenancy utilization of data processing and communication resources.

BACKGROUND

Cloud computing typically involves deploying remote servers and making software and services available to remote servers and end-users using a centralized data storage model. The cloud computing model is designed to cut costs by allowing companies to focus on the key aspects of a business rather than Information Technology (IT) concerns.

Quality of service is one critical aspect of cloud computing since resources are not provided locally. In cloud computing, service provider companies may provide resources and services to one or more other companies. Providing superior quality of service at reasonable prices to companies who have different and varying CPU, multi-media (video, voice, text, email, etc.), and other data needs can be challenging.

SUMMARY

It is with respect to the above issues and other problems that the embodiments presented herein were contemplated. Embodiments herein are generally directed toward providing proactive capacity adjustment based on expected and real demand, as well as offering automated solutions and adjustments prior to, during, and after events.

Capacity adjustment may be based on demand, as well as offering automated solutions and adjustments prior to, during, and after events. Resource pooling and rapid elasticity are adjustable elements that may be utilized.

In resource pooling the service provider's computing resources are pooled to serve multiple consumers using a multi-tenant model, with different physical and virtual resources dynamically assigned and reassigned according to consumer demand.

Rapid elasticity provides for the rapid provisioning and releasing of capabilities, which may be performed automatically, to scale rapidly outward and inward commensurate with demand. As a benefit, the capabilities available for provisioning often appear unlimited to the consumer, which can be appropriated in any quantity at any time.

Resource pooling and/or rapid elasticity can be changed as usage changes, and incentives and discounts can be offered for dropping or shifting load. One problem is that despite a customer's knowledge of the events that trigger an increase in capacity, prior art models continue to be reactive.

In one embodiment, a multi-tenancy capacity module is provided to automatically and dynamically determine events and intervals in which capacity might be compromised. Bandwidth can then be adjusted up or down using a change in mix (e.g., use only voice and not video for a time interval), replacing click-to-connect with click-to-callback for an interval, and reduction/deferral to the future before hitting a threshold or other demarcation point.

Service level agreements (SLAs) can be set to provide voice-only to reserve capacity or provide other mechanisms, which may make the distribution seem random across all customers. For hosted solutions, all customers and intervals could be monitored to provide patterns.

One benefit which may be realized by implementing certain embodiments provided herein is a reduction in the cloud computing cost/resources required to service pending or predicted events. This differs from the reducing of agent time or requesting enough agents to handle a situation. In one embodiment, adjustments are made to provide tradeoffs with and between communication methods and the resource requirements. In one example, communications to SMS/chat would be favored during a spike in utilization, thus allowing maximum engagement volume with minimal computing, network, and bandwidth costs. As demand subsides, email, voice, and multimedia communications may be resumed in one or more steps.

In another embodiment, resources may be added to a static or dynamic threshold level (elasticity) and the additional control of communication services modes is provided as one means to balance increased computing/network capacity with alternate service options.

One benefit of implementing embodiments described herein improve with the state of the art that allows contact centers to more readily move calls between channels, add/remove modes of communication, and perform other call handing operations. For example, every time it snows more than six inches in Chicago, one airline's resource usage goes up 63%. The multi-tenancy capacity module alerts a second and third airline (who have no weather alerts) that for six hours, they will be offering only voice-based assistance (or be charged additional fees for video according to the existing SLAs), and 25% of the work requests will be offered call-back assistance. After the interval, services are automatically restored to offering multi-channel capabilities without restriction.

Additionally, the usage data may be provided to workforce prediction, analytics, and other processes to allow proactive option management before the resource capacity is increased or decreased. As a benefit, the multi-tenancy capacity module can provide smarter and more efficient capacity planning for the whole hosted solution, rather than just asking for predictions and creating reserves.

In one embodiment, a system is disclosed, comprising: a set of resources utilized in providing a service to a customer of the contact center during electronic communications between the customers and agents of the contact center and the set of resources having a monitored resource; a first communications channel utilizing a first subset of the resources comprising at least the monitored resource; a second communication channel utilizing a second subset of the resources; a resource manager configured to monitor utilization of the monitored resource and upon determining the utilization of the monitored resource has reached a previously determined threshold, incentivize a portion of the electronic communications to utilize the second communications channel.

In another embodiment, a method is disclosed, comprising: monitoring utilization of a monitored resource of a set of resources of a contact center, the monitored resource being one resource of a set of resources utilized in providing a service to customers of the contact center during electronic communications between the customers and agents of the contact center; determining the monitored resource is over-utilized; in response to the determination, incentivizing a portion of the electronic communications to utilize a second communications channel having a lesser demand on the monitored resource than a first communication channel.

In another embodiment, a non-transitory computer-readable medium with instructions thereon is disclosed that when read by the computer cause the computer to perform: monitoring utilization of a monitored resource of a set of resources of a contact center, the monitored resource being one resource of a set of resources utilized in providing a service to customers of the contact center during electronic communications between the customers and agents of the contact center; determining the monitored resource is over-utilized; in response to the determination, incentivizing a portion of the electronic communications to utilize a second communications channel having a lesser demand on the monitored resource than a first communication channel.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium," as used herein, refers to any tangible storage that participates in providing instructions to a processor for execution. Such a medium may take many forms, including, but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid-state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module," as used herein, refers to any known or later-developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices that may be shown in block diagram form, and are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
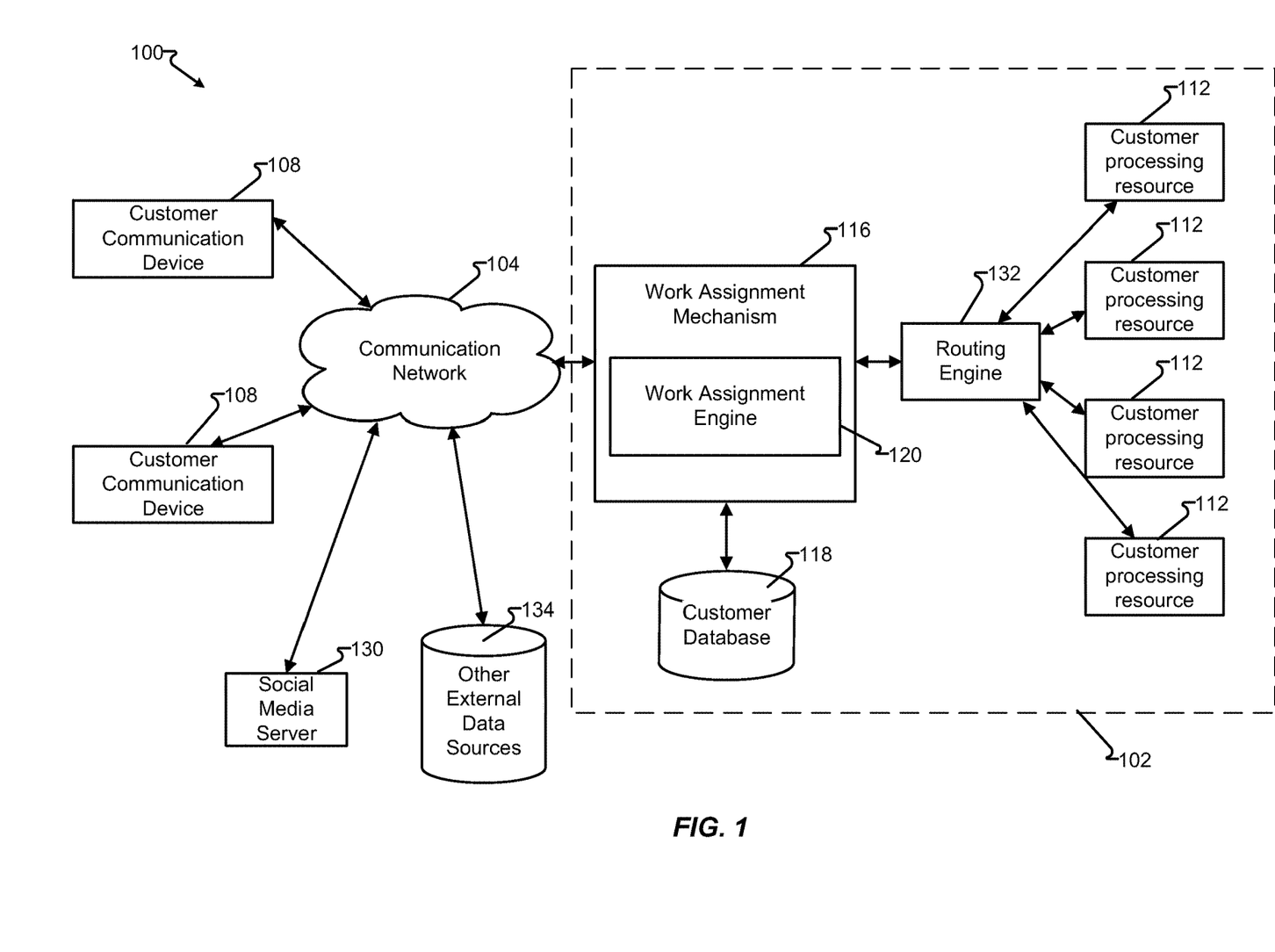
FIG. 1 depicts a communication system in accordance with embodiments of the present disclosure.

With reference now to FIG. 1, communication system 100 is discussed in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering contact center 102 in which a plurality of customer processing resources 112 are distributed to handle incoming work items (in the form of contacts) from customer communication devices 108.

Contact center 102 is variously embodied to receive and/or send messages that are or are associated with work items and the processing and management (e.g., scheduling, assigning, routing, generating, accounting, receiving, monitoring, reviewing, etc.) of the work items by one or more customer processing resources 112. The work items are generally generated and/or received requests for a customer processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical (e.g., customer processing resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of customer processing resources 112, customer database 118, and/or other component may connect to routing engine 132 via communication network 112, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or customer processing resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically within contact center 102, such as when a customer utilizes customer communication device 108 at a kiosk, attaches to a private network of contact center 102 (e.g., WiFi connection to a kiosk, etc.) within or controlled by contact center 102 and still be considered external to contact center 102.

It should be appreciated that the description of contact center 102 provides at least one embodiment whereby the following embodiments may be more readily understood without limiting such embodiments. Contact center 102 may further be altered, added to, and/or subtracted from without departing from the scope of any embodiment described herein and without limiting the scope of the embodiments or claims, except as expressly provided.

Additionally, contact center 102 may incorporate and/or utilize social media website 130 and/or other external data sources 134 may be utilized to provide one means for a customer processing resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media website 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item. Illustrative work items include, but are not limited to, a contact directed toward and received at a contact center 102, a web page request directed toward and received at a server farm (e.g., collection of servers), a media request, an application request (e.g., a request for an application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media network or server 130. Exemplary architectures for harvesting social media communications and generating work items based thereon are described in U.S. patent application Ser.

Nos. 12/784,369, 12/706,942, and 12/707,277, filed Mar. 20, 1010, Feb. 17, 2010, and Feb. 17, 2010, respectively, each of which is hereby incorporated herein by reference in its entirety.

The format of the work item may depend upon the capabilities of the communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a customer processing resource 112 is assigned to the work item representing that communication at which point the work assignment mechanism 116 passes the work item to a routing engine 132 to connect the communication device 108, which initiated the communication with the assigned customer processing resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general, each communication device 108 may be adapted to support video, audio, text, and/or data communications with other communication devices 108 as well as the processing customer processing resources 112. The type of medium used by the communication device 108 to communicate with other communication devices 108 or processing customer processing resources 112 may depend upon the communication applications available on the communication device 108.

In accordance with at least some embodiments of the present disclosure, the work item is sent toward a collection of customer processing resources 112 via the combined efforts of the work assignment mechanism 116 and routing engine 132. The customer processing resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact center 102.

As discussed above, the work assignment mechanism 116 and customer processing resources 112 may be owned and operated by a common entity in a contact center 102 format. In some embodiments, the work assignment mechanism 116 may be administered by multiple enterprises, each of which has its own dedicated customer processing resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from customer processing resource 112 processing the work item.

In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of customer processing resources 112 for processing.

Figure 2:
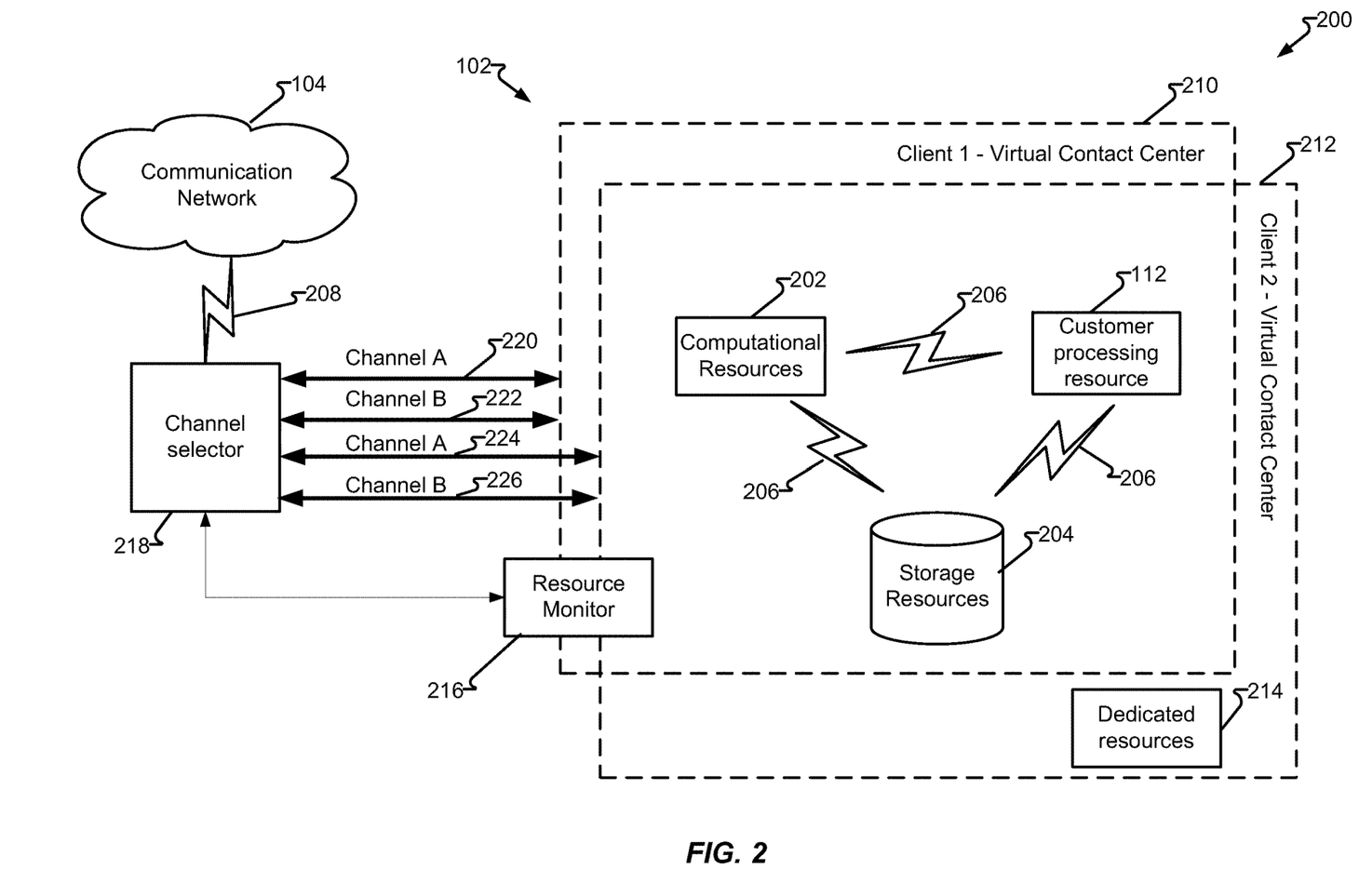
FIG. 2 depicts a diagram in accordance with embodiments of the present disclosure.

FIG. 2 depicts diagram 200 in accordance with embodiments of the present disclosure. FIG. 2 illustrates certain components of contact center 102, which may include components described with respect to FIG. 1, additional, or alternative components. Contact center 102 provides customer service to customers contacting or contacted by contact center 102 to provide a customer service (e.g., performing a task, providing information, receiving information, etc.). Contact center 102 includes resources internal to contact center 102 and/or utilized by contact center 102 that may directly facilitate the communication between the contact center 102 and the customer and/or provide services for the management of such communications and the resources utilized for such communications and other needs of contact center 102.

In one embodiment, contact center 102 is configured to conduct two types of communications, one type via channel A 220, 224 and a second type via channel B 222, 226. In other embodiments, contact center 102 supports many more communication types and/or channels. In one embodiment, communications of a first type and utilizing channel A 220, 224 utilizes more resources than communications of a second type and utilizing channel B 222, 226. Resources, as used herein, may be computational, communication (e.g., bandwidth), and customer processing resources (e.g., human agents, automated agents, etc.) and may also have physical limitations (e.g., number of telephone circuits available, human agents available during a shift, etc), a practical limitation as dictated by another limitation (e.g., a customer wait time over an acceptable amount, etc.).

In another embodiment, a channel, as used herein is variously embodied. In one embodiment, the difference between two channels (e.g., channel A 220 and channel B 222) is defined by the data conveyed by the communication, including but not limited to, audio-video, audio (telephone), audio (VoIP), text chat, email, co-browse, etc. In another embodiment, the channel is defined by differences in interaction time, such as a real-time conversation including audio, video, or text versus a delayed communication, such as email or voicemail.

Returning to the resources utilized by contact center 102, the resources may be physically and/or logically integrated into contact center 102 or utilized by contact center 102, such as communication network 104 and/or communication link 208. Communications network 104 may be and/or incorporate communication link 208 and may further comprise one or more of a public network (e.g., Internet, public switched telephone network, etc.) and/or one or more private networks (e.g., enterprise communications, WAN, LAN, wireless LAN, etc.). Customers utilizing their respective customer communication devices 108 communicate with customer processing resources 112. Contact center 102 incorporates a variety of resources in order to provide service to the customers. Resources may be incentivized or allocated statically or dynamically to one or more clients of the contact center 102. For example virtual contact center 210 and virtual contact center 212 may provide their respective customer's with the appearance of dedicated resources, however such resources may be shared. For example, a customer of a clothing retailer may call a telephone number, send an email, initiate a chat, or otherwise initiate contact with contact center 102 to place an order and utilize some, most, or all resources also utilized by a customer of an airline calling to change a flight reservation. Dedicated resources 214 may comprise resources that are physically, contractually, or otherwise dedicated solely to one particular client, such as virtual contact center 212.

In order for contact center 102 to process communications between customer processing resources 112 and customers utilizing customer communication devices 108, various communication, storage, computational and/or other resources may be implemented to manage, monitor, route, access and store data, and otherwise process the communications and provide administrative services for contact center 102. For example computational resources 202 may comprise components, such as certain customer processing resources 112 (e.g. interactive voice response systems, automated agents, etc.), as well as routing engine 132 work assignment mechanism 116 and work assignment engine 120, as well as other data processing components. Resources may also include storage resources 204, such as databases within a contact center 102 or other data repositories, such as social media server 130 and/or other data sources 134 (See FIG. 1). Additionally customer processing resources 112 may be human agents, automated agents, or a combination thereof. Customer processing resources 112 may be differentiated by an attribute of a similar resource, such as one human agent having a higher level of skill with respect to a certain ability (e.g., fluency with a particular language, familiarity with a certain product, expertise, and using video chat, etc.) as compared with another human agent.

Communication resources 206 and/or 208 provide communication connectivity to and from contact center 102 as well as between components within a contact center 102 such as between computational resources 202, customer processing resources 112, and/or storage resources 204. Communication resources 206 may be entirely within a contact center 102 or utilize partially or completely external communications, such as the Internet, to provide data connectivity to physically dispersed components.

In one embodiment, a communication with one customer communication device 108 may have a preferred communication channel. Resource monitor 206 monitors the unit utilization of resources within a contact center 102. During times when the utilization is below a predetermined threshold, contact center 102 may allow customer communication device 108 to utilize the preferred communication channel selected by customer communication device 108. Additionally a client associated with a particular customer utilizing customer communication device 108 may determine the preferred communication channel. For example, a high-end retailer may contractually obligate contact center 102 to provide its customers with a certain communication channel exclusively or within an acceptable variation, such as no more than 10% of requests for video communications with a human agent may be downgraded to an audio-only channel with a human agent and no more than 1% may be downgraded to a call-back channel. In contrast, another retailer may require less resource intensive services of contact center 102 and thereby permit the use of lower demand communication channels, such as email, text chat, and automated agents. In another embodiment, specific customers (e.g., "gold," "platinum," customers asking about a luxury automobile, etc.) may be immune to downgrading or downgraded before other customers (e.g., "silver," customers asking about an entry-level automobile, etc.).

Contact center 102 may face uneven demand for services. For example, contact center 102, may provide an airline with human and automated reservation agents. A spike in demand may be triggered, or anticipated, by a snowstorm and a number of flight cancellations and delays. contact center 102 may reduce the utilization of resources by downgrading communications from a higher demand channel to a lower demand channel. For example, video-chat customers may be downgraded to audio-only chat when bandwidth is, or is predicted, to be over a predetermined threshold. If customer processing resources 112 are, or are predicted, to be over utilized, a live agent channel may be downgraded to an automated agent channel and/or live interactions may be downgraded to a call-back channel. In another embodiment, the downgrading may occur for a different customer. For example, virtual contact center 210 may have customer processing resources 112 (e.g., human agents) overwhelmed by customers calling to reschedule flights. In response, virtual contact center 212 may have communications downgraded to utilize more automated agents and/or non-real-time interactions with human agents. In another example, contact center 102 may learn of flight delays and virtual contact center 210 may be a hotelier. Virtual contact center may upgrade communications to a live agent from automated agents, ones of the customer processing resources 112, in order to notify guests that they may want to alter their travel plans due to the flight delays.

In another embodiment, resource monitor 216 provides reactive and/or proactive inputs to channel selector 218. Resource monitor 216 may be a standalone computer or server or a process or processor running on a shared electronic component of contact center 102 (e.g., routing engine 132). Resource monitor 216 may receive utilization for one or more resources of contact center 102 (e.g., communication links 206, computational resources 202, storage resources 204, etc.) and/or external components (e.g., communications network 104). Additionally, resource monitor 216 may receive external data from sources, not shown (e.g., social media, service provider, etc.), such as to receive weather alerts that may be associated with an increase in demand for customer processing resources 112 associated with rebooking delayed and cancelled flights and cause resource monitor 216 to proactively signal channel selector 218.

Channel selector 218 routes communication to one of at least two communication channels for one or more clients or virtual contact centers (e.g., virtual contact center 210, 212). For example, communications with customer processing resources 112 for virtual contact center 210 may be provided by channel A 220, when demand is at or below normal and channel B 222 when a resource demand is above a threshold amount. Similarly, communications with customer processing resources 112 of virtual contact center 212 may be provided by channel A 224 and, if demand on a resource is above a threshold, channel B 226.

Figure 3:
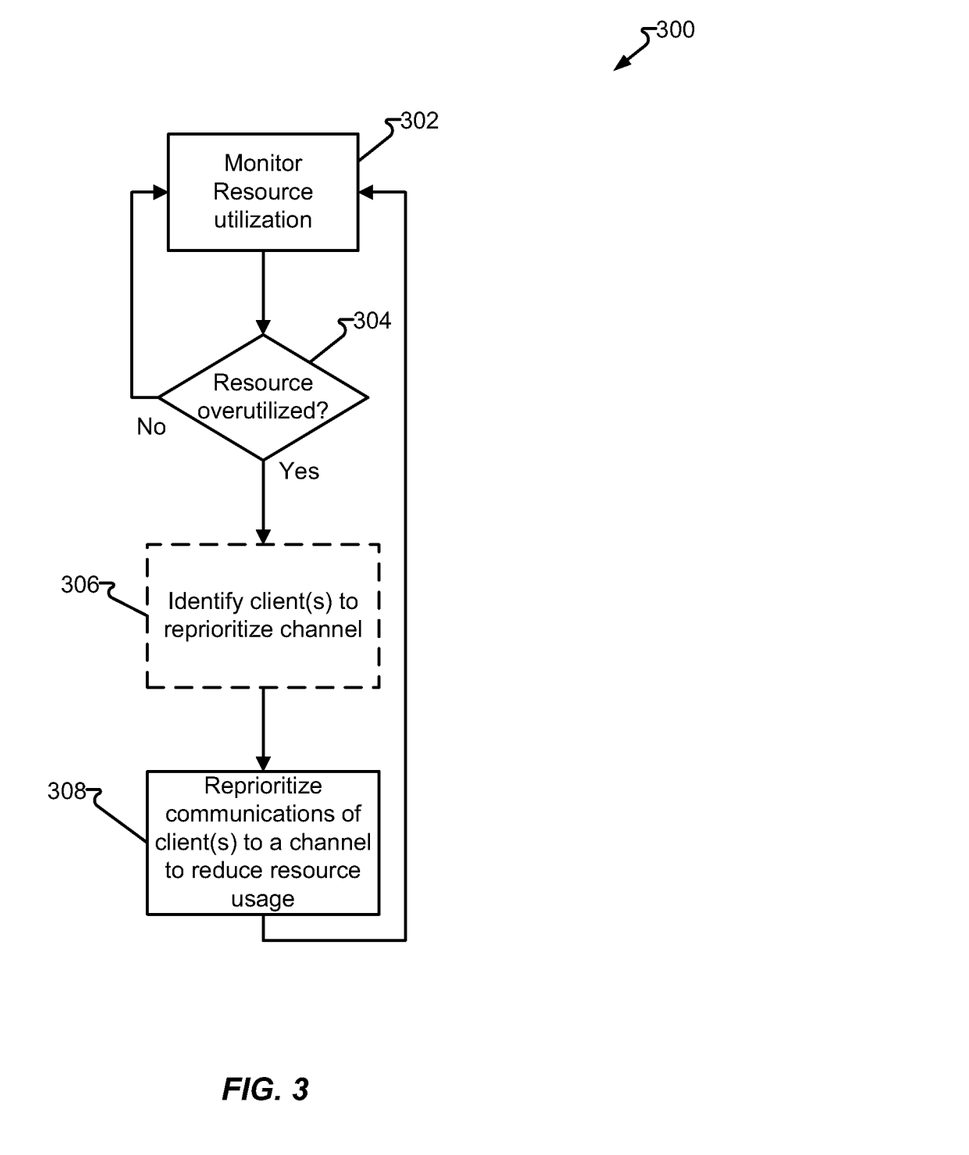
FIG. 3 depicts a first process in accordance with embodiments of the present disclosure.

FIG. 3 depicts process 300 in accordance with embodiments of the present disclosure. In one embodiment, step 302 monitors a resource's utilization. The resource monitored may be any aspect of a contact center or impacting a contact center (e.g., Internet operations, telephone system outage, etc.). Step 304 determines if the resource is overutilized. Overutilization may be determined by direct measurement, such as a key performance indicator (KPI), idle time of a server, lines of communication utilized, etc. In another embodiment, overutilization may be determined by indirect measurement (e.g., customers complaining of garbled speech on a call, response times of system components being outside of normal parameters, etc.). If step 304 is determined in the negative, processing continues to step 306 otherwise processing may loop back to step 302, whereby monitoring by step 302 may be ongoing. If step 304 is determined in the positive, processing continues to step 306 if implemented or, if not, to step 308.

Step 306 optionally identifies a client of the contact center to be the subject of reprioritization. For example, contact center 102 has three clients. One client has terms that forbid channel reprioritization, a second client is causing a spike in voice-channel utilization, and a third client is operating normally but does not have terms that forbid channel reprioritization. Step 306 may then select the second and/or third client for channel reprioritization. Step 308 then executes the reprioritization of the channel that has been determined to reduce the utilization of the resource determined in step 302.

Figure 4:
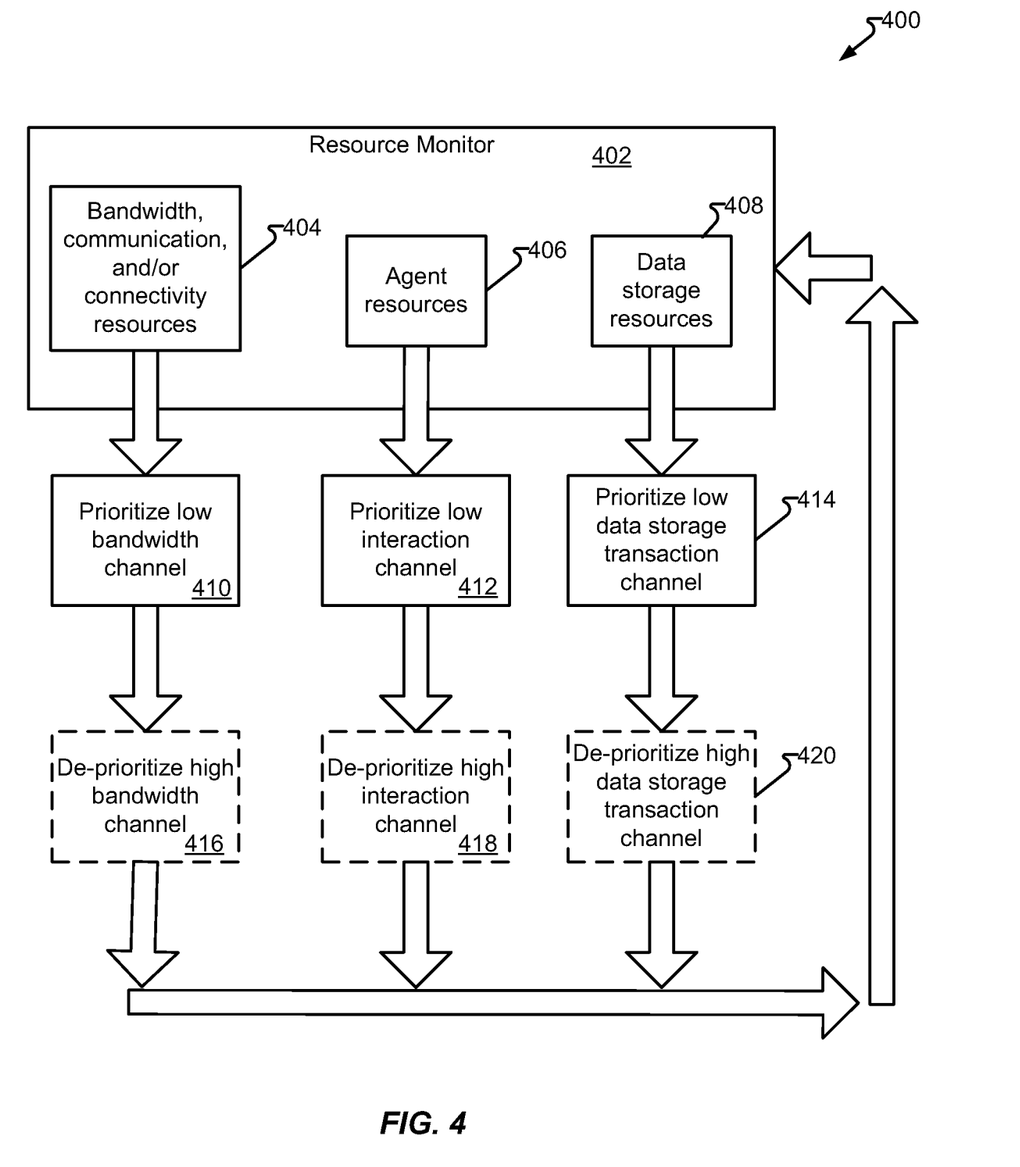
FIG. 4 depicts a second process in accordance with embodiments of the present disclosure.

FIG. 4 depicts process 400 in accordance with embodiments of the present disclosure. In one embodiment, resource monitor 402 monitors at least one of a number of resources (e.g., communication, agent or customer processing resources, and data storage resources). It should be appreciated that other resources may be monitored as well as specific types of resources (e.g., French speaking agent utilization, access to historic data storage, bandwidth for high-definition video, etc.). In one embodiment, resource monitor 402 monitors communication and/or connectivity resources 404, agent resources 406, and data storage resources 408. In other embodiments other resources and/or resource types are monitored.

In a first embodiment, block 404 of resource monitor 402 monitors bandwidth, communications, and/or connectivity resources. Block 404 may comprise internal networks, components, systems, endpoints, etc. and/or external systems and components (e.g., internet, telephone network, etc.). For example, an Internet service provider (ISP) providing communication services may experience a partial or total outage whereby communication via telephone networks (e.g., PSTN) is the only or primary means of communication between a customer and a contact center. Block 404 indicates a communication resource is overutilized. Overutilization may be relative based on a current state. In another embodiment, overutilization is an availability or capacity. An outage of a component or system is an overutilization when such components or systems are likely interfering with normal operations. For example, a complete outage of PSTN connectivity would be an overutilization, for resource monitoring purposes, even if the PSTN was currently unable to handle a single call. Accordingly, block 410 may prioritize low bandwidth channels to reduce the bandwidth, communication, and/or connectivity utilization of block 404. For example, call-back channels may be prioritized above live agent communications, text communications may be prioritized above voice or video, etc.

Prioritization is variously embodied. In one embodiment, the menu options of a interactive voice response (IVR) is provided with dynamic updates to cause customers of the contact center to be presented, or more prominently presented, with low-bandwidth options. For example, a "speak to an agent" option may be omitted, placed lower in a menu of other options, or associated with a discouraging message (e.g., "Press 1 to leave a message and your call will be returned in approximately thirty minutes. Press 2 to speak to a live agent. Your hold time will be approximately forty minutes . . . "). Clients of contact center 102 may be provided with financial or other incentives to accommodate the reallocation of communications to address the resource overutilization. As a further option, block 416 may de-prioritize high bandwidth channel communications, such as by throttling video and/or audio communications (e.g., lower frame rate, lower sampling rate, etc.).

In a second embodiment, block 406 monitors agent resources. Agent resources monitored by block 406 are variously embodied and may include availability of all agents or a subset of agents. For example, demand on French speaking agents may spike. However, additional agents may be available who are sufficiently fluent, perhaps with access to translation resources, to communicate via written French. Block 412 prioritizes low interaction channel communications. For example, text-based communication channels, message and call-back channels, automated agents, etc. may be prioritized. Optionally, block 418 may de-prioritize high interaction channel. Such as by allocating agents who do speak French to text-based communications, particularly if an agent has faster call completion via text than with spoken. Block 412 may then incentivizes customers of contact center 102 to utilize low-interaction channels (e.g., faster response by leaving a message, etc.) Block 418 may optionally de-prioritize high interaction channels (e.g., "To speak to a live agent, please call back after . . . ", "Your hold time is approximately, one hour . . . ," etc.).

In a third embodiment, block 408 monitors data storage resources. As most computer systems employ fast and ample storage systems, storage-based limitations may be rarely encountered. However, certain storage-based limitations may be common. For example, a passenger on an airline may need to find a receipt for a flight taken years ago. Such records may be offline and require a more extensive retrieval process. Additionally, some data storage may be offline due to ongoing backup operations, new equipment installation, or outages. Accordingly, block 414 may prioritize low data storage and/or retrieval channels and/or block 420 may de-prioritize channels with high data storage and/or retrieval. This may comprise communication channel based prioritizations, such as when a call-back at a later time may coincide with better availability of data, versus a live conversation that must wait for such availability to return.

Figure 5:
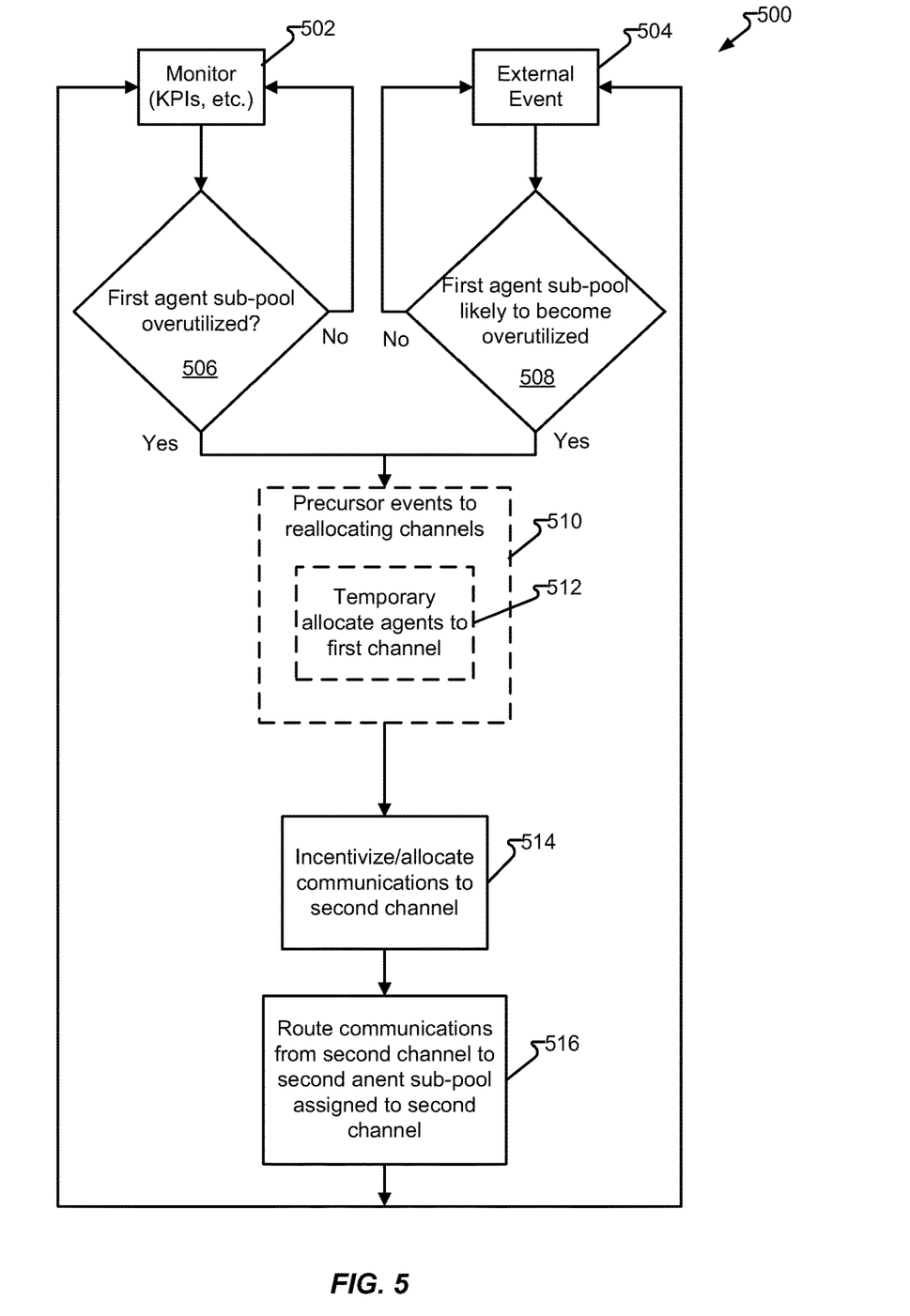
FIG. 5 depicts a third process in accordance with embodiments of the present disclosure.

FIG. 5 depicts process 500 in accordance with embodiments of the present disclosure. In one embodiment, step 502 monitors a resource (e.g., free bandwidth, lines in use, lines available, agent queues, and/or other KPIs, data retrieval/storage times, etc.). Next, step 506 determines if a first agent sub-pool is overutilized. For example, agents skilled in a particular language have certain expertise with a product, are qualified to communicate utilizing a particular medium (e.g., video, voice, text, etc.), or are part of another agent subset. If yes, processing may continue to optional step 510 or step 514 as a matter of design choice.

In another embodiment, step 504 receives an external event notification. Step 504 may be for one particular client (e.g., a snowstorm at a client airline's hub city) or more universal (e.g., a backhoe just cut a major fiber optic line). Step 504 may be more predictive of a future overutilization, including outages, as opposed to a measurement of the current state of a resource, such as provided by step 502. Next, step 508 determines if a first agent sub-pool is likely to become overutilized. For example, a plane operated by a client airline just had a flight from New York to Barcelona cancelled. Step 508 may determine that Spanish-speaking agents will become overutilized as many passengers on the flight will require rebooking services by Spanish-speaking agents. If step 508 is determined in the affirmative, processing continues to optional step 510 or step 514 as a matter of design choice.

Step 510 may optionally be executed to perform precursor events prior to reallocation of communications to a particular channel. For example, Spanish speaking agents may be allocated to Spanish text-based communications in order to clear the text-based work queue that is, or is likely, to become a prioritized channel as opposed to a voice-based channel. Step 510, in another example, may incentivize and/or allocate a number of communications to more marginally skilled Spanish speaking agents for later assignment to text-based channels. As a more specific option, step 512 may temporarily allocate agents to a first communications channel. For example, prior to communications being prioritized to a second communications channel, the communications on a first communications channel may be more rapidly completed, such as when the first communications channel is to be completely terminated and/or to make it available for premium-rate communications.

Step 514 then incentivizes and/or allocates communications to a second communications channel. For example, agents skilled in text-based Spanish may now receive communications that may otherwise require a more skilled speech-based Spanish language agent. Step 516 then routes the communication to the second communications channel and the agents allocated thereto.

Figure 6:
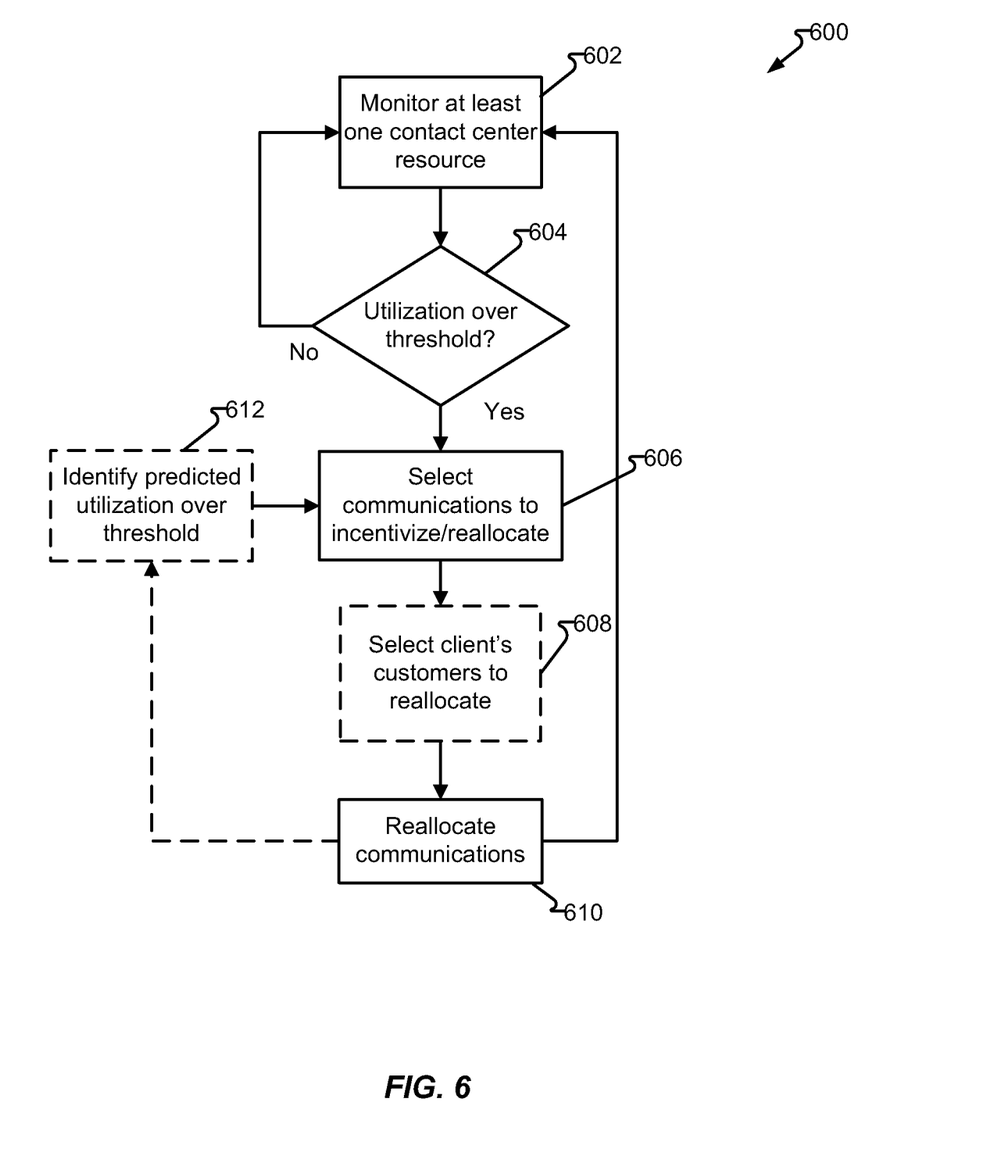
FIG. 6 depicts a fourth process in accordance with embodiments of the present disclosure.

FIG. 6 depicts process 600 in accordance with embodiments of the present disclosure. Process 600 begins with the monitoring of a resource, such as resource monitor 216 monitoring one or more components of contact center 102 and/or resources utilized by contact center 102 (e.g., communications network 104, communications link 208, etc.). Step 604 determines if the utilization is over a previously determined threshold.

In one embodiment, the resource monitored is a pool of human agents, each a customer processing resource 112. Step 604 may determine utilization is over a threshold if the wait time to speak and/or see a human agent is over an acceptable amount, such as a contractual threshold. In another embodiment, the resource is a communication bandwidth, such as communication links 206, 208. Step 604 may determine the utilization is over a threshold when dropped packets make video and/or VoIP communication unacceptable to the customer or a human agent or both.

Next, step 606 selects communications to incentivize and/or reallocate. Step 606 may cause audio-video to become audio only, audio-only to become text chat, text chat to become email, or other combination whereby the resource monitored in step 602 may have the utilization demanded thereof reduced. Optionally, step 608 may determine one or more customers to be subject to the reallocation. Step 608 may cause the customer, whose communications are causing or more substantially contributing to the utilization over the threshold amount, to be incentivized and/or reallocated. Optionally, step 608 may select another customer to be subject to the communication reallocations. Step 610 performs the reallocation and process 600 may continue back to step 602 and/or initiate a return to normal allocation (See FIG. 7). Optionally, step 612, such as when executed by resource monitor 216, may identify a predicted utilization over threshold, such as in the example above where a weather service alerts contact center 102 of a snow storm that is likely to cause flight delays and cancelations impacting resources of contact center 102.

In another embodiment, a client of contact center 102 may be incentivized to have their communications reallocated. For example, contact center 102 may provide a lower fee for clients who permit their communications to be downgraded. Alternatively, clients who wish to be an exception to a potential downgrading may be charged a premium to utilize non-downgraded communication channels. A client of contact center 102 may, for example, respond to an incentive by dynamically removing a "push to chat with an agent" button on their website. The button may be removed or changed to a "push to text with an agent" or "push to leave a message" or otherwise require customers to use a less resource-demanding channel of communication.

Figure 7:
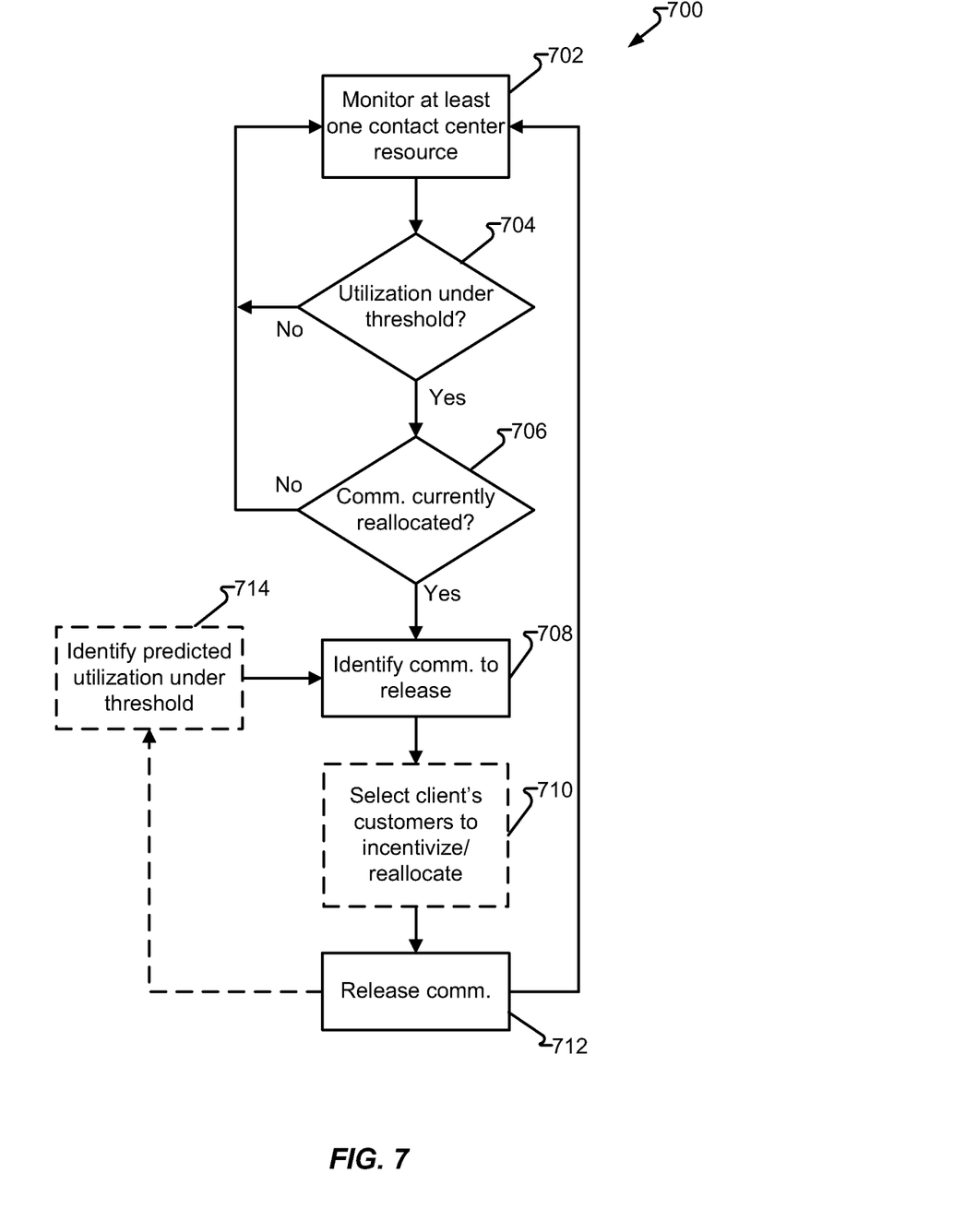
FIG. 7 depicts a fifth process in accordance with embodiments of the present disclosure.

FIG. 7 depicts process 700 in accordance with embodiments of the present disclosure. Process 700 starts at step 702 monitoring a shared resource, such as by resource monitor 216. Optionally, step 702 may be step 602 of process 600. Next, step 704 determines if a monitored resource is under a threshold amount. For example, a particular resource may be over utilized when used at 95% capacity and above and underutilized when at 85% capacity and below. If step 704 determines a resource is underutilized, then the resource may have additional demands routed thereto and processing continues to step 706, otherwise processing may return to step 702.

Step 706 determines if communications are currently being reallocated, such as step 604 being determined in the affirmative. If no, processing may return to step 702 and demand for the resources of contact center 102 is below threshold and may optionally be managed by other means. However, if step 706 is answered in the affirmative, processing continues to step 708 wherein communications to release, that is, communications that have been downgraded to reduce the demand on a resource, may now be returned to their previous state or a state of a lesser downgrade. Step 710 optionally selects one or more clients to be subject to the release of the communications channel. Step 712 is then executed, such as when resource monitor 216 signals channel selector 218 to return communications to channel A 220 when previously allocated to channel B 222.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU), or logic circuits programmed with the instructions to perform the methods (FPGA). These machine-executable instructions may be stored on one or more machine-readable mediums, such as CD-ROMs or other types of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium, such as a storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A system, comprising:
    a monitored resource of a set of resources, wherein each monitored resource of the set of resources is a physical component and further comprises at least one of an electronic computational component and electronic connectivity component and is utilized to provide a service to customers of a contact center;
    a first subset of the set of the resources, including the monitored resource, providing a first communication channel for electronic communications in one of audio-video, telephone audio, voice-over-IP audio, text chat, email, and co-browse data;
    a second subset of the set of resources, different from the first subset of the set of resources but including the monitored resource, providing a second communication channel for the electronic communications in a different one of audio-video, telephone audio, voice-over-IP audio, text chat, email, and co-browse data and wherein the electronic communications utilize the monitored resource to a lesser extent when conducted on the second communication channel as compared to the first communication channel;
    providing the set of resources in a first configuration comprising a channel selection component providing a first channel selection option to enable customers of the contact center to initiate a future portion of the electronic communications via a selection of one of the first communication channel and second communication channel;
    a resource monitor, within a device, monitoring utilization of the monitored resource and upon determining that the monitored resource is overutilized, causing the set of resources to be provided in a second configuration comprising the channel selection component providing a second channel selection option to provide at least one of hindering initiation of the future portion of the electronic communications via the first communication channel and incentivizing initiation of the future portion of the electronic communications via the second communication channel; and
    upon receiving the selection, initiating the future portion of the electronic communications via the selected one of the first communication channel and the second communication channel; and
    wherein hindering access to the first communication channel comprises disabling access to the first communication channel for the future portion of the electronic communications.

2. The system of claim 1, wherein a previously determined threshold is adjusted based upon the resource monitor receiving indicia of a current event associated with an historical event that is known to impact demand on the monitored resource.

3. The system of claim 1, wherein the first communications channel and the second communication channel each comprise a portion of the set of resources to facilitate communication on a different one of audio-video, audio, text chat, email, real-time communications, and non-real-time communication.

4. The system of claim 1, wherein the monitored resource further comprises a processor executing a work assignment engine to maintain a queue of work items.

5. The system of claim 1, wherein the monitored resource further comprises a processor executing a work assignment engine to maintain a queue of work items having a common attribute.

6. The system of claim 1, wherein the monitored resource comprises a communication resource providing communication connectivity between at least one customer communication device and at least one agent communication device.

7. The system of claim 1, wherein the resource monitor is further configured to discontinue hindering access to the first communication channel for the future portion of the electronic communications to utilize the second communications channel upon determining the monitored resource is no longer above a previously determined threshold.

8. The system of claim 1, wherein the resource monitor, further causes the system to hinder access to the first communication channel for the future portion of the electronic communications associated with a portion of the customers of the contact center associated with a first client of the contact center and not associated with a second client of the contact center.

9. A method, comprising:
provdiing electronic communications between customer communication devices utilized by customers of a contact center and agent communication devices utilized by agents of the contact center, the electronic communications utilizing a set of resources, wherein each resource of the set of resources is a physical component and further comprises at least one of an electronic computational component and electronic connectivity component and comprises a first communication channel utilizing a first subset of the set of resources comprising a monitored resource and the first communication channel conveying one of audio-video, telephone audio, voice-over-IP audio, text chat, email, and co-browse data and a second communication channel utilizing a second subset of the set of resources different from the first subset of the set of resources and wherein the second communication channel conveys a different one of audio-video, telephone audio, voice-over-IP audio, text chat, email, and co-browse data and wherein the electronic communications utilize the monitored resource to a lesser extent when conducted on the second communications channel as compared to the first communication channel;
monitoring utilization of the monitored resource;
determining that the monitored resource is overutilized;
providing the set of resources in a first configuration further comprising providing a first channel selection option to enable customers of the contact center to initiate a future portion of the electronic communications via a selection of one of the first communication channel and second communication channel;
in response to the determination that the monitored resource is overutilized, providing the set of resources in a second configuration further comprising a second channel section option, comprising at least one of hindering initiation of the future portion of the electronic communications via the first communication channel and incentivizing initiation of the future portion of the electronic communications via the second communication channel, to incentivize the future portion of the electronic communications to utilize the second communications channel; and
upon receiving a selection of the first communication channel and the second communication channel, initiating the future portion of the electronic communications via the selected one of the first communication channel and the second communication channel; and
wherein hindering access to the first communications channel comprises disabling access to the first communication channel for the future portion of the electronic communications.

10. The method of claim 9, wherein:
the customers of the contact center are associated with one of a first client and a second client; and
wherein the step of incentivizing further comprising incentivizing customer associated with a first client of the contact center to utilize the second communication channel.

11. The method of claim 10, wherein, the step of incentivizing further comprising incentivizing customers associated with both the first client and the customers associated with the second client to utilize the second communication channel.

12. The method of claim 9, wherein the step of incentivization is provided to a first client of the contact center to incentivize the first client to have customers associated with the first client utilize the second communication channel.

13. The method of claim 9, wherein the first communication channel utilizes the set of resources comprising a processor executing a work assignment engine to maintain a queue of work item.

14. A system comprising:
means for monitoring utilization of a monitored resource of a set of resources of a contact center, wherein each monitored resource of the set of resources is a physical component and further comprises at least one of an electronic computational component and electronic connectivity component and the monitored resource is one resource of a set of resources utilized in providing a service to customers of the contact center during electronic communications between customer communication devices utilized by customers of the contact center and agent communication devices utilized by agents of the contact center and the monitored resource is one of a first subset of the set of resources providing a first communication channel providing a first communication type, the first communication channel conveying one of audio-video, telephone audio, voice-over-IP audio, text chat, email, and co-browse data;
means for determining that the monitored resource is overutilized;
means to provide the set of resources in a first configuration comprising means to provide a first channel selection option to enable customers of the contact center to initiate a future portion of the electronic communications via a selection of one of the first communication channel and second communication channel;
in response to the determination that the monitored resource is overutilized, means to provide the set of resources in a second configuration comprising a second channel section option comprising at least one of hindering initiation of the future portion of the electronic communications via the first communication channel or incentivizing initiation of the future portion of the electronic communications via the second communication channel and thereby incentivize a future portion of the electronic communications to utilize a second communication channel utilizing a second subset of the set of resources different from the first subset of the set of resources, the second communication channel conveying a different one of audio-video, telephone audio, voice-over-IP audio, text chat, email, and co-browse data; and
upon receiving the selection of one of the first communication channel and second communication channel, means to initiate the future portion of the electronic communications via the selected one of the first communication channel and the second communication channel; and
wherein hindering access to the first communication channel comprises disabling access to the first communication channel for the future portion of the electronic communications.

15. The system of claim 14, wherein:
the customers of the contact center are associated with one of a first client and a second client; and wherein a means for incentivizing further comprise means for incentivizing customer associated with a first client of the contact center to utilize the second communication channel.

16. The system of claim 15, wherein a means for incentivizing further comprise means for incentivizing customers associated with both the first client and the customers associated with the second client to utilize the second communication channel.

17. The system of claim 16, wherein the means for incentivization further comprise means for providing incentives to a first client of the contact center to incentivize the first client to have customers associated with the first client utilize the second communication channel.

18. The system of claim 14, wherein the first communications channel utilizes the set of resources comprising a processor executing a work assignment engine to maintain a queue of work item.

* * * * *

UNITED STATES PATENT AND TRADEMARK OFFICE
CERTIFICATE OF CORRECTION

PATENT NO. : 10,873,538 B2
APPLICATION NO. : 14/704071
DATED : December 22, 2020
INVENTOR(S) : Valentine C. Matula, David Skiba and George Erhart It is certified that error appears in the above-identified patent and that said Letters Patent is hereby corrected as shown below:

In the Claims

At Column 16, Line 40, Claim 3 please delete "communications" and insert --communication-- therein.

At Column 17, Line 46, Claim 9 please delete "communications" and insert --communication-- therein.

At Column 19, Line 15, Claim 18 please delete "communications" and insert --communication-- therein.

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*